United States Patent
Lim et al.

(10) Patent No.: US 10,641,679 B2
(45) Date of Patent: May 5, 2020

(54) LEAKAGE DETECTION SYSTEM AND LEAKAGE DETECTION METHOD

(71) Applicant: HAESUNG DS CO., LTD., Changwon-si (KR)

(72) Inventors: Hyun Tae Lim, Seoul (KR); Jin Seop Jang, Seoul (KR)

(73) Assignee: HAESUNG DS CO., LTD., Changwon-si (KR)

( * ) Notice: Subject to any disclaimer, the term of this patent is extended or adjusted under 35 U.S.C. 154(b) by 57 days.

(21) Appl. No.: 16/145,070

(22) Filed: Sep. 27, 2018

(65) Prior Publication Data

US 2019/0128769 A1    May 2, 2019

(30) Foreign Application Priority Data

Oct. 27, 2017   (KR) .......................... 10-2017-0141321

(51) Int. Cl.
| | |
|---|---|
| *G01M 3/40* | (2006.01) |
| *G08B 21/20* | (2006.01) |
| *G08B 21/12* | (2006.01) |

(52) U.S. Cl.
CPC .............. *G01M 3/40* (2013.01); *G08B 21/12* (2013.01); *G08B 21/20* (2013.01)

(58) Field of Classification Search
CPC .......... G01M 3/40; G01M 3/16; G08B 21/20; G08B 21/12; F16N 2200/08; G01R 19/18; H03M 1/12
See application file for complete search history.

(56) References Cited

U.S. PATENT DOCUMENTS

| | | | | |
|---|---|---|---|---|
| 5,381,097 A | * | 1/1995 | Takatori | G01M 3/045 174/47 |
| 6,082,184 A | * | 7/2000 | Lehmann | G01M 3/3281 73/49.3 |
| 8,981,345 B2 | * | 3/2015 | Yu | G01N 27/127 257/29 |
| 2012/0038912 A1 | * | 2/2012 | Yamada | G01M 3/16 356/240.1 |
| 2015/0084614 A1 | * | 3/2015 | Alatainio | G01M 3/16 324/71.1 |
| 2018/0188133 A1 | * | 7/2018 | Cader | G01M 3/40 |
| 2018/0292340 A1 | * | 10/2018 | Koenig | G01N 27/124 |

FOREIGN PATENT DOCUMENTS

| | | |
|---|---|---|
| KR | 101173636 B1 | 8/2012 |
| KR | 1020150041564 A | 4/2015 |
| KR | 1020170078264 A | 7/2017 |

\* cited by examiner

*Primary Examiner* — Christopher P McAndrew
*Assistant Examiner* — Zannatul Ferdous
(74) *Attorney, Agent, or Firm* — Schwabe, Williamson & Wyatt, P.C.

(57) ABSTRACT

A leakage detection system includes a sensing unit that contacts a leakage liquid, a resistance measuring unit configured to measure an electrical resistance of the sensing unit by applying a direct current to the sensing unit, and a determination unit configured to determine whether the leakage liquid is a dangerous solution or a safe solution based on a first graph showing a change over time of the electrical resistance measured by the resistance measuring unit, wherein the dangerous solution is an acidic solution or an alkaline solution and the safety solution is water.

20 Claims, 9 Drawing Sheets

LEAKAGE DETECTION SYSTEM AND LEAKAGE DETECTION METHOD

CROSS-REFERENCE TO RELATED APPLICATION

This application claims the benefit of Korean Patent Application No. 10-2017-0141321, filed on Oct. 27, 2017, in the Korean Intellectual Property Office, the disclosure of which is incorporated herein in its entirety by reference.

BACKGROUND

1. Field

One or more embodiments relate to a leakage detection system and a leakage detection method, and more particularly, to a leakage detection system for easily distinguishing chemicals from water and improving the leakage sensitivity with respect to chemicals and a leakage detection method.

2. Description of the Related Art

In industrial installations or plants that use a liquid, a leakage sensor is installed around a liquid container or around a joint between pipes transporting the liquid to detect leakage of water or chemicals.

In particular, when chemicals leak out of a container or pipe, the leakage of chemicals into soil, ground water, etc. may not only pollute the surrounding natural environment, but also may come into contact with a human body and cause various fatal diseases.

Therefore, special attention is required in handling chemicals, and various systems for monitoring the leakage of chemicals need to be provided in a chemical reservoir installed indoors or outdoors.

Various leakage detection methods, such as a short circuit method, a pH sensing method, and a paper discoloration method, may be used for such a leakage detection system. Specifically, in the case of the short circuit method, a short circuit is generated by the contact between a leaking liquid and a conductive solution, thereby detecting a change in conductivity. In the case of the pH sensing method and the paper discoloration method, a change in a measuring device's numerical value or a change in the color of a special paper due to a pH change are detected.

When such leakage detection systems and leakage detection methods are used, it is difficult to distinguish between chemicals and water, and errors may occur due to rainwater or the like in the case of an outdoor container, installation, etc. In addition, a space for collecting a sufficient amount of a leakage solution has to be provided separately or a user has to directly check the leakage solution with the naked eye.

SUMMARY

In order to solve various problems including the problems described above, one or more embodiments include a leakage detection system for easily distinguishing chemicals from water and improving the leakage sensitivity with respect to chemicals, and a leakage detection method. However, the embodiments are merely examples, and the scope of the present disclosure is not limited thereto.

Additional aspects will be set forth in part in the description which follows and, in part, will be apparent from the description, or may be learned by practice of the presented embodiments.

According to one or more embodiments, a leakage detection system includes: a sensing unit that contacts a leakage liquid; a resistance measuring unit configured to measure an electrical resistance of the sensing unit by applying a direct current to the sensing unit; and a determination unit configured to determine whether the leakage liquid is a dangerous solution or a safe solution based on a first graph showing a change over time of the electrical resistance measured by the resistance measuring unit, wherein the dangerous solution is an acidic solution or an alkaline solution and the safety solution is water.

The determination unit may include a calculation unit configured to calculate data about a slope of a second graph obtained by performing curve-fitting of measured values of the electrical resistance in a certain time interval and data about a deviation between the second graph and the first graph.

The leakage detection system may further include a database unit configured to store first standard data about the slope and second standard data about the deviation with respect to at least one of the acidic solution and the alkaline solution, and third standard data about the slope and fourth standard data about the deviation with respect to the water.

The determination unit may be configured to compare data about the slope calculated based on present measurement values of the electrical resistance with the first standard data and the third standard data, and compare data about the deviation calculated based on the present measurement values of the electrical resistance with the second standard data and the fourth standard data.

The leakage detection system may further include an output unit configured to output an alarm signal when the determination unit determines that the leakage liquid is the dangerous solution.

The leakage detection system may further include an analog-to-digital converter configured to convert the measured electrical resistance into a digital value.

The sensing unit may include: a base layer; a leakage-reacting layer positioned on the base layer and having at least one reaction pattern extending in a length direction of the base layer; and a protective layer positioned on the leakage-reacting layer, wherein a plurality of openings exposing a portion of the at least one reaction pattern are spaced apart from each other in the protective layer.

The at least one reaction pattern may include at least one of graphene and graphite, a conductive polymer, and a binder.

The at least one reaction pattern may include a first reaction pattern and a second reaction pattern spaced apart from each other in a width direction of the base layer.

The plurality of openings may include a plurality of first openings positioned along a first virtual row extending in the length direction of the base layer and a plurality of second openings positioned along a second virtual row extending in the length direction of the base layer.

The leakage-reacting layer may include a conductive pattern extending in the length direction of the base layer, and the conductive pattern may be spaced apart from the at least one reaction pattern in a width direction of the base layer.

According to one or more embodiments, a leakage detection method includes: measuring an electrical resistance of a sensing unit in contact with a leakage liquid by applying a direct current to the sensing unit; and determining whether the leakage liquid is a dangerous solution or a safe solution based on a first graph showing a change over time of the measured electrical resistance, wherein the dangerous solution is an acidic solution or an alkaline solution, and the safety solution is water.

The measuring of the electrical resistance of the sensing unit may include switching a direction in which the direct current flows and measuring the electrical resistance in real time.

The leakage detection method may further include, after the measuring of the electrical resistance of the sensing unit, determining whether a present state is a normal state based on the measured electrical resistance.

The leakage detection method may further include: obtaining a second graph by curve-fitting the first graph in a certain time interval; and calculating data about a slope of the second graph and data about a deviation between the second graph and the first graph.

The leakage detection method may further include storing the calculated data about the slope and the calculated data about the deviation in real time in a database unit.

The determining of whether the leakage liquid is the dangerous solution or the safe solution may include comparing data about the slope and data about the deviation, calculated based on present measurement values of the electrical resistance, with standard data.

The standard data may include: first standard data about the slope and second standard data about the deviation, with respect to the acidic solution or the alkaline solution; and third standard data about the slope and fourth standard data about the deviation, with respect to the water.

The leakage detection method may further include outputting an alarm signal when it is determined that the leakage liquid is the dangerous solution.

The leakage detection method may further include converting the measured electrical resistance into a digital value.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
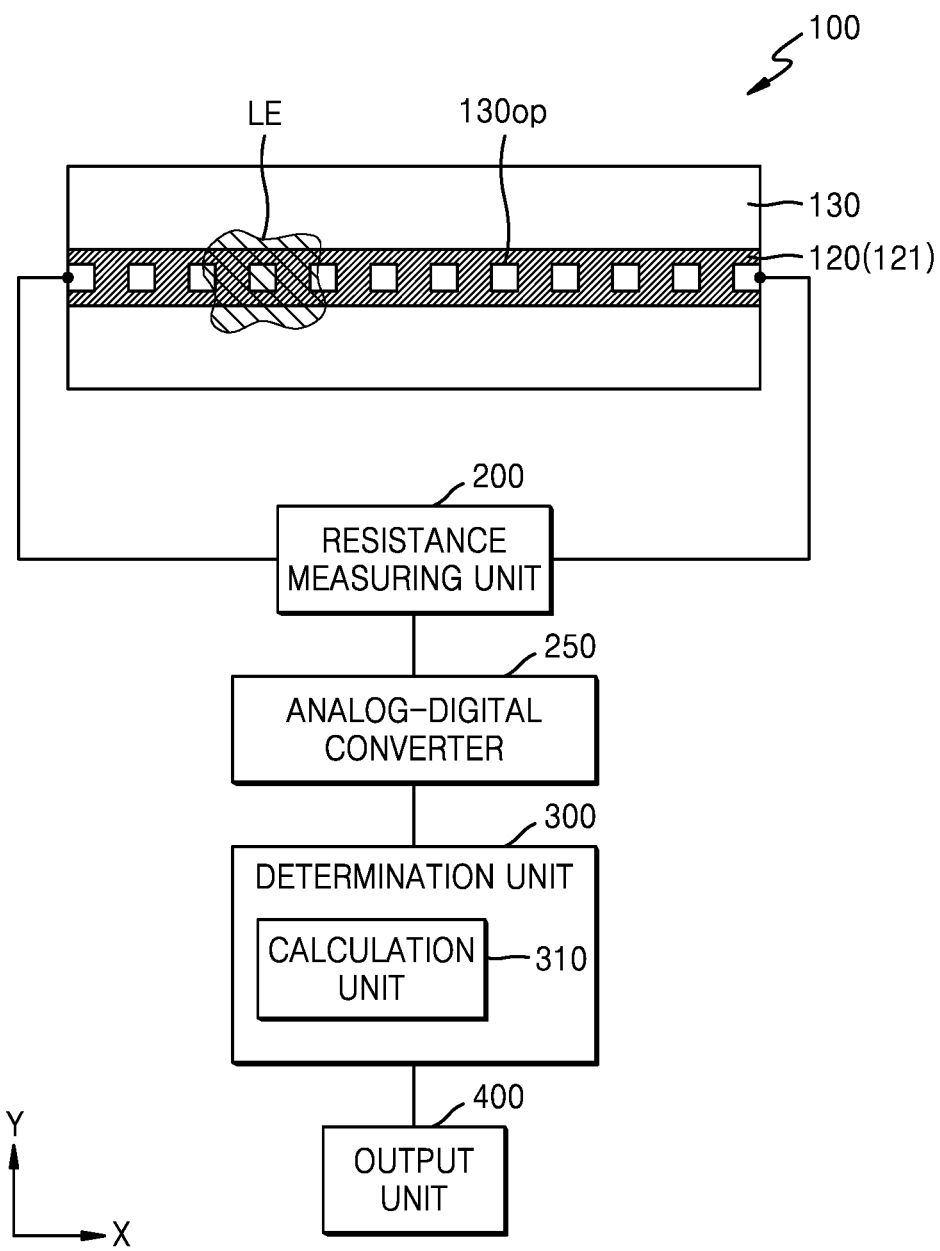
FIG. 1 is a configuration diagram of a leakage detection system according to an embodiment.

As the present disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In the description of the present disclosure, certain detailed explanations of the related art are omitted when it is deemed that they may unnecessarily obscure the essence of the disclosure.

While such terms as "first", "second", etc., may be used to describe various components, such components must not be limited to the above terms. The above terms are used only to distinguish one component from another.

It will be understood that when a layer, region, or component is referred to as being "formed on" another layer, region, or component, it can be directly or indirectly formed on the other layer, region, or component. That is, for example, intervening layers, regions, or components may be present.

The x-axis, y-axis, and z-axis used in the present specification are not limited to the three axes of a rectangular coordinate system, but may be interpreted in a general sense as referring to a coordinate system with three axes. For example, the x-axis, the y-axis, and the z-axis may be orthogonal to each other, but may refer to different directions that are not orthogonal to each other.

Reference will now be made in detail to embodiments, examples of which are illustrated in the accompanying drawings. Like reference numerals refer to like elements throughout, and thus their description will be omitted. In the drawings, the thicknesses of layers and regions are exaggerated for clarity. Expressions such as "at least one of", when preceding a list of elements, modify the entire list of elements and do not modify the individual elements of the list.

Figure 2:
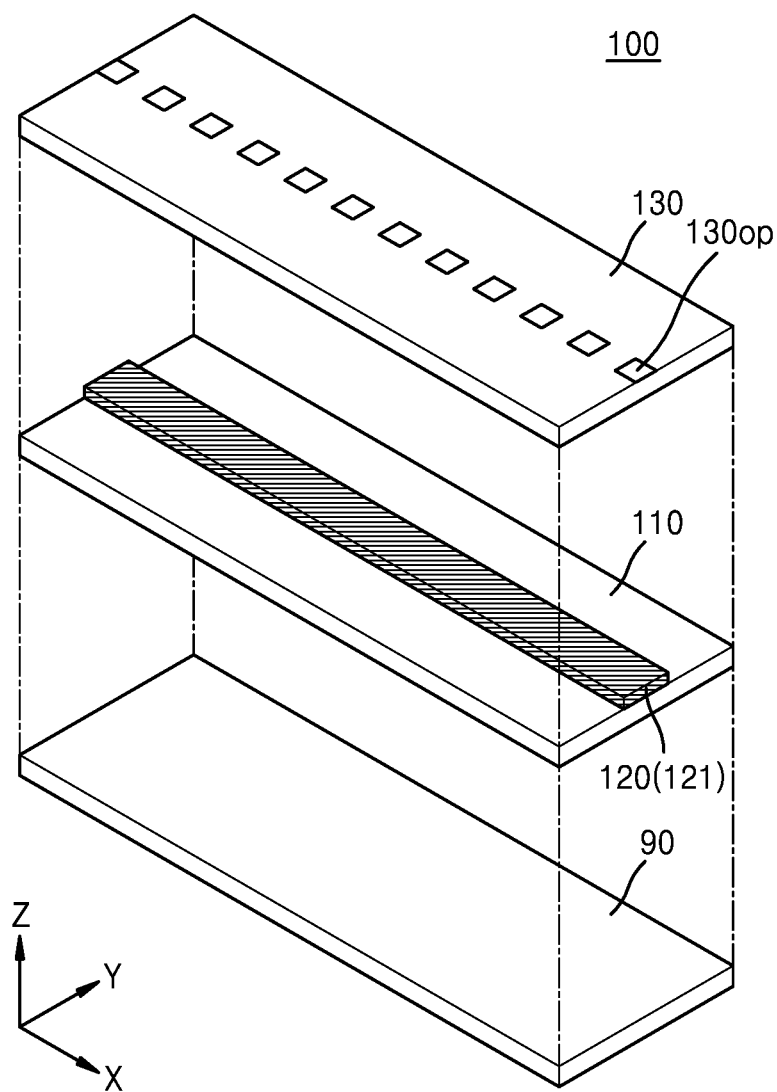
FIG. 2 is a perspective view showing a sensing unit of the leakage detection system of FIG. 1.

FIG. 1 is a configuration diagram of a leakage detection system according to an embodiment, FIG. 2 is a perspective view showing a sensing unit 100 of the leakage detection system of FIG. 1, and FIGS. 3A to FIG. 3C are graphs showing resistance-time curves plotted by the sensing unit 100 of FIG. 2.

Referring to FIGS. 1 and 2, the leakage detection system according to the present embodiment may include the sensing unit 100, a resistance measuring unit 200, and a determination unit 300.

The sensing unit 100 contacts a leakage liquid LE and functions as a leakage sensor. Specifically, as shown in FIG. 2, the sensing unit 100 may include a base layer 110, a leakage-reacting layer 120 positioned on the base layer 110, and a protective layer 130 positioned on the leakage-reacting layer 120, The base layer 110 supports the sensing unit 100, and the overall shape of the sensing unit 100 may be determined according to the shape of the base layer 110. For example, the base layer 110 may have a film shape, but is not limited thereto, and may have a bulk shape such as a cylindrical shape or a columnar shape. Therefore, the sensing unit 100 may be changed to have a film shape or a bulk shape according to the shape of the base layer 110.

In an embodiment, the base layer 110 may be a film elongated in the +X direction as shown in FIGS. 1 and 2. More specifically, the base layer 110 may be a rectangular film having a long side extending in the +X direction, The base layer 110 may include various materials. For example, the base layer 110 may include a resin including a flexible material such as polyethylene terephthalate (PET), polyimide (PI), and fluoroethylene vinyl ether (FEVE). Thus, the sensing unit 100 may be installed on the outer surface of a structure having a complicated shape.

An adhesive layer 90 may be positioned under the base layer 110. Accordingly, the sensing unit 100 may be easily attached to a container, a facility, a pipe, or the like to monitor leakage of chemicals therefrom.

The adhesive layer 90 may have a thin film shape so as to stably adhere to a mounting surface. A shape of the adhesive layer 90 may be the same as or similar to that of the base layer 110.

The leakage-reacting layer 120 is positioned on the base layer 110. A change in an electrical resistance occurs in the leakage-reacting layer 120 due to a reaction with a leakage liquid LE such as chemicals or water. The leakage liquid LE is substantially detected through the leakage-reacting layer 120.

The leakage-reacting layer 120 has at least one reaction pattern 121 extending in the length direction of the base layer 110, that is, in the +X direction. Various embodiments relating to an arrangement, shape, number, and the like of the at least one reaction pattern 121 will be described later with reference to FIGS. 4 to 6.

The at least one reaction pattern 121 may be prepared in a paste state and applied onto the base layer 110 or may be prepared in an ink state and printed on the base layer 110 by using a rubber pad. However, this is merely an example and the at least one reaction pattern 121 may be also patterned on the base layer 110 in various other ways.

In an embodiment, the at least one reaction pattern 121 may include graphene, a conductive polymer, and a binder.

When a chemical solution or water comes into contact with graphene in an energized state, an additional circuit is temporarily generated while a contact liquid covers the surface of the graphene. This results in a change in the electrical resistance of the graphene, which depends on the chemical properties of the liquid in contact with the graphene. Specifically, the pattern of a change in the electrical resistance of the graphene changes depending on whether the liquid in contact with the graphene is an acidic solution, an alkaline solution, or water.

Figure 3A:
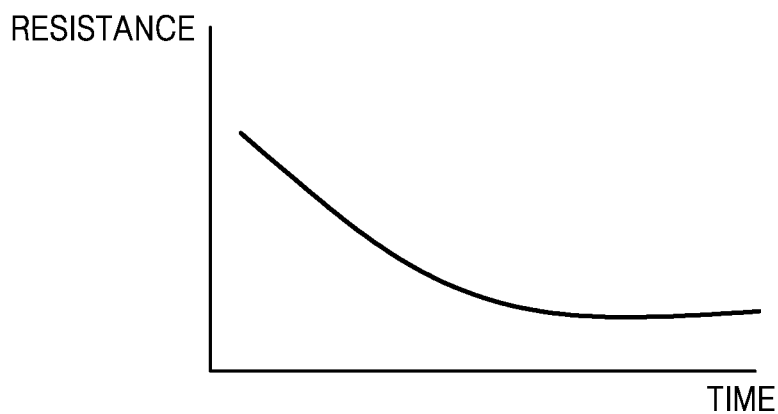
FIGS. 3A to FIG. 3C are graphs showing resistance-time curves plotted by the sensing unit of FIG. 2.
Figure 3B:
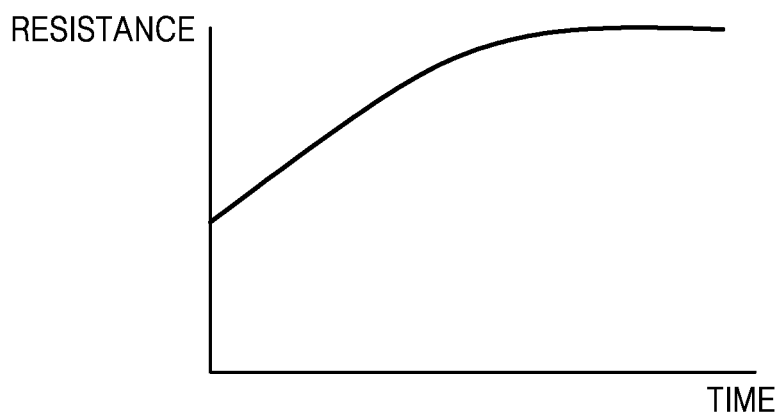
Figure 3C:
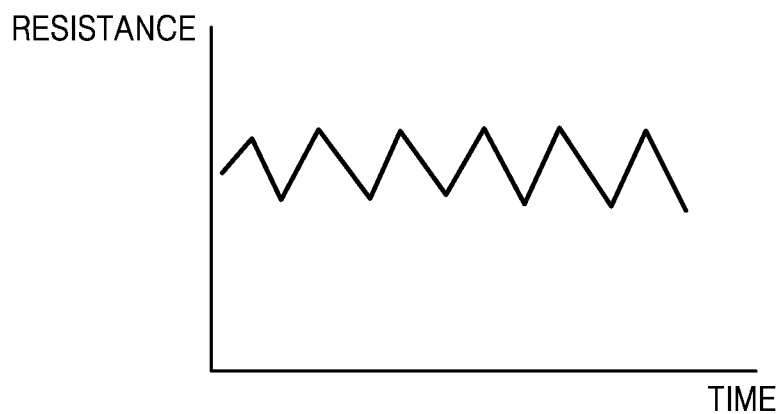

When an acidic solution contacts the graphene, the electrical resistance of the graphene roughly decreases with time as shown in FIG. 3A. On the other hand, when an alkaline solution contacts the graphene, the electrical resistance of the graphene roughly increases with time as shown in FIG. 3B. When water contacts the graphene, the electrical resistance of the graphene changes continuously with time as shown in FIG. 3C. In this case, a slope at which the electrical resistance of the graphene changes is not greater than a slope at which the electrical resistance of the acidic solution or the alkaline solution changes.

Therefore, when the reaction pattern 121 including graphene contacts the leakage liquid LE in an energized state, the pattern of a change in the electrical resistance of the reaction pattern 121 may be analyzed to thereby determine whether the leakage liquid LE is an acidic solution, an alkaline solution, or water.

The graphene in the reaction pattern 121 may include single layer or multi-layer graphene (GO, rGO, and GNP) and may be replaced with conductive carbon nanotube (CNT) or graphite.

The leakage detection system according to the present embodiment may accurately determine whether a detected leakage liquid LE is a chemical or water by measuring a change in the electrical resistance of the reaction pattern 121 as described above.

The protective layer 130 is positioned on the leakage-reacting layer 120. The protective layer 130 may cover the leakage-reacting layer 120 along an entire length thereof, and thus, the at least one reaction pattern 121 provided in the leakage-reacting layer 120 may be prevented from being pressed or broken by an external impact or the like.

The protective layer 130 may have a plurality of openings 130op. In this case, the plurality of openings 130op may be spaced apart from each other and expose a portion of the at least one reaction pattern 121 to the outside. As a result, the leakage liquid LE flows into the sensing unit 100 through the plurality of openings 130op and comes into contact with the at least one reaction pattern 121.

The plurality of openings 130op may be arranged substantially in a line in the +X direction, which is the length direction of the reaction pattern 121. The plurality of openings 130op may overlap the reaction pattern 121, and thus, the leaking liquid LE may stably contact the reaction pattern 121.

The protective layer 130 may include various materials. In an embodiment, similar to the base layer 110, the protective layer 130 may include a resin including a flexible material such as polyethylene terephthalate (PET), polyimide (PI), and fluoroethylene vinyl ether (FEVE).

Although not shown in FIG. 2, an adhesive layer (not shown) may be further provided between the protective layer 130 and the leakage-reacting layer 120 to more effectively protect the leakage-reacting layer 120 from external impacts. The adhesive layer may be used to attach the protective layer 130 to the leakage-reacting layer 120. In this case, the adhesive layer may include an adhesive material.

The resistance measuring unit 200 is connected to the sensing unit 100. The resistance measuring unit 200 measures the electrical resistance of the reaction pattern 121 of the sensing unit 100, which includes graphene or the like. Thus, a change in electrical resistance occurring in the reaction pattern 121 when the reaction pattern 121 contacts the leakage liquid LE may be detected.

In order to measure the electrical resistance of the reaction pattern 121, the resistance measuring unit 200 is electrically connected to the reaction pattern 121 to apply a direct current to the reaction pattern 121. The resistance measuring unit 200 may be connected to both ends of the reaction pattern 121 to form an electric circuit.

Although not shown in FIG. 1, the resistance measuring unit 200 may include an adjusting unit (not shown) for adjusting the applied direct current. The adjusting unit may be of a button type or a dial type. Also, the resistance measuring unit 200 may include a display unit (not shown) for displaying measurement conditions and the like.

The electrical resistance of the reaction pattern 121 measured by the resistance measuring unit 200 may be transmitted to the determination unit 300. In this case, an analog value of the measured electrical resistance may be converted into a digital value through an analog-digital converter 250, and then the digital value may be input to the determination unit 300. Accordingly, the determination unit 300 may easily perform complicated calculations or large-scale data processing based on the digital values.

The determination unit 300 determines whether the leakage liquid LE is a dangerous solution or a safe solution based on electrical resistance data calculated from an input electrical resistance value. The dangerous solution may be an acidic solution or an alkaline solution, and the safe solution may be water.

Specifically, the electrical resistance data that is used as a basis for determination by the determination unit 300 is a graph showing a change over time of electrical resistance measured with respect to the reaction pattern 121. Hereinafter, such raw data is referred to as a first graph.

The determination unit 300 may include a calculation unit 310. The calculation unit 310 compares the first graph with another graph and calculates a linear second graph to facilitate analysis.

A method used by the determination unit 300 and the calculation unit 310 to determine whether the leakage liquid LE is a dangerous solution or safe solution based on the first graph will be described later with reference to FIG. 7 or the like.

When the determination unit 300 determines that the leakage liquid LE is a dangerous solution, that is, an acidic solution or an alkaline solution, an output unit 400 outputs an alarm signal. Although not shown specifically in FIG. 1, the alert signal may be a warning sound or a warning image, or may be transmitted directly to an administrator in the form of a notification message.

By directly informing the administrator through the alarm signal that an acidic solution or an alkaline solution has leaked, a danger that may occur due to the leakage of chemicals may be quickly prevented.

Figure 4:
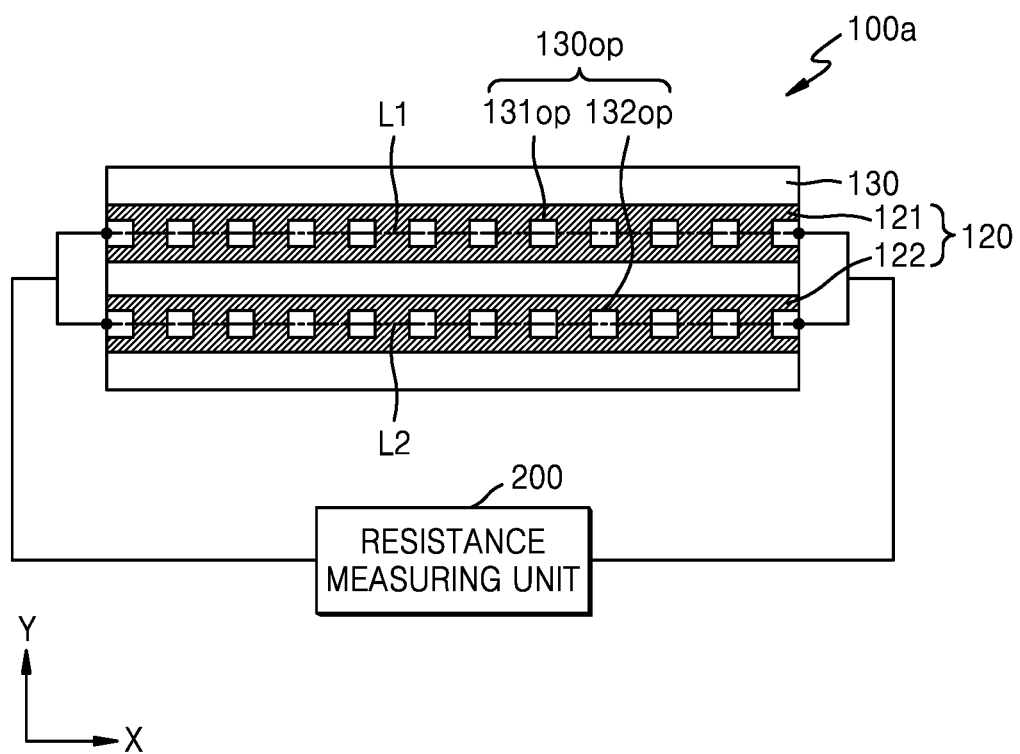
FIG. 4 is a configuration diagram of a leakage detection system according to another embodiment.
Figure 5:
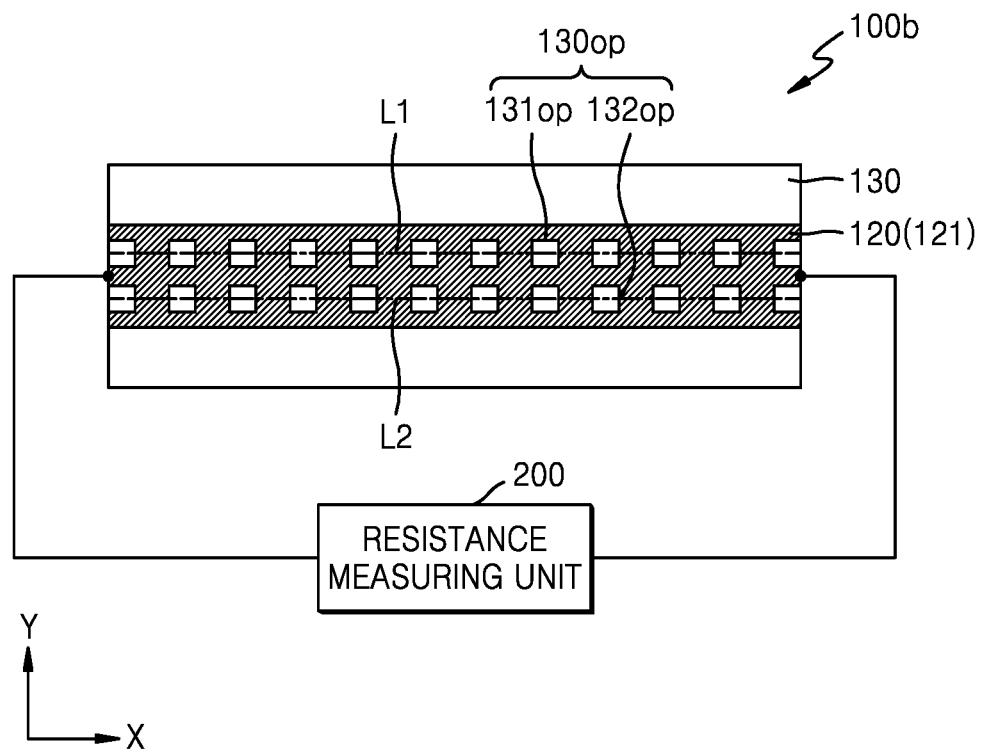
FIG. 5 is a configuration diagram of a leakage detection system according to another embodiment.
Figure 6:
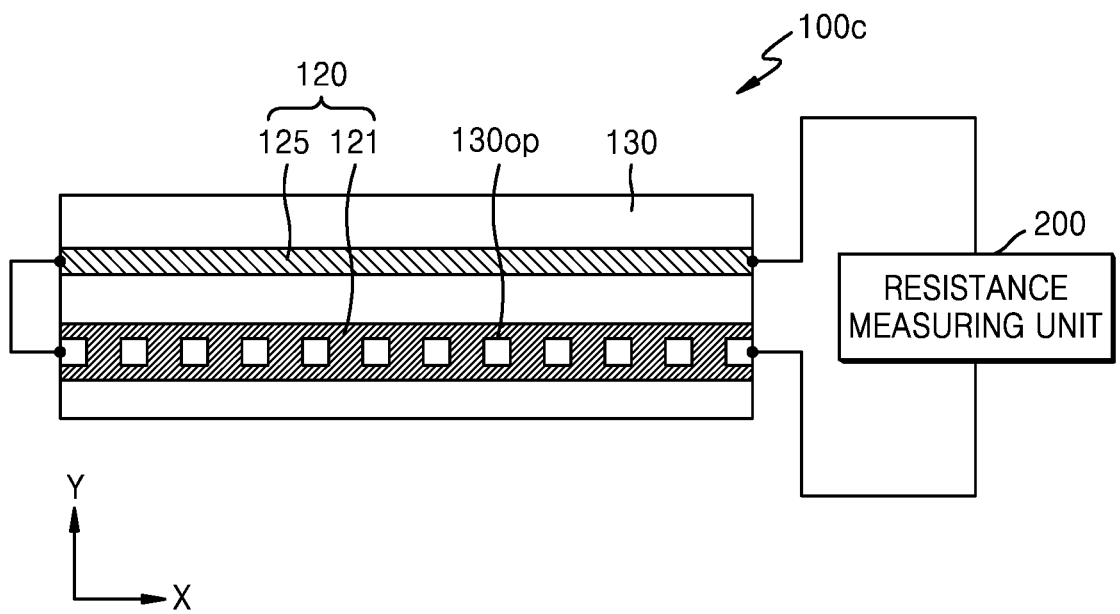
FIG. 6 is a configuration diagram of a leakage detection system according to another embodiment.

FIG. 4 is a configuration diagram of a leakage detection system according to another embodiment, FIG. 5 is a configuration diagram of a leakage detection system according to another embodiment, and FIG. 6 is a configuration diagram of a leakage detection system according to another embodiment.

The leakage detection systems according to the embodiments shown in FIGS. 4 to 6 are different from the leakage detection system according to the embodiment shown in FIG. 1 in terms of the structure of the sensing structure 100 and a connection method between the sensing unit 100 and the resistance measuring unit 200. The remaining configuration of each of the leakage detection systems according to the embodiments shown in FIGS. 4 to 6 is the same as or similar to that of the leakage detection system according to the embodiment shown in FIG. 1. Therefore, hereinafter, descriptions the same as those described above with reference to FIGS. 1 and 2 are abbreviated or omitted.

The analog-digital converter 250, the determination unit 300, and the output unit 400 shown in FIG. 1 may be applied to all of the embodiments shown in FIGS. 4 to 6, and thus, these elements are omitted in FIGS. 4 to 6.

Referring to FIG. 4, in the leakage detection system according to another embodiment, a sensing unit 100a may include a plurality of reaction patterns, that is, a first reaction pattern 121 and a second reaction pattern 122.

In the sensing unit 100a, a leakage-reacting layer 120 is positioned on a base layer (not shown), and a protective layer 130 is positioned on the leakage-reacting layer 120.

In an embodiment, the leakage-reacting layer 120 may include a first reaction pattern 121 and a second reaction pattern 122, each extending in the +X direction, in this case, the first reaction pattern 121 and the second reaction pattern 122 may be spaced apart from each other in the +Y direction, which is the width direction of the base layer or the protective layer 130.

Therefore, a plurality of openings 130op formed in the protective layer 130 also include a plurality of first openings 131op and a plurality of second openings 130op. The plurality of first openings 131op correspond to the first reaction pattern 121 and expose a portion of the first reaction pattern 121, and the plurality of second openings 132op correspond to the second reaction pattern 122 and expose a portion of the second reaction pattern 122.

Since the first reaction pattern 121 and the second reaction pattern 122 are spaced apart from each other, the plurality of first openings 131op may be arranged along a first virtual row L1 extending in the +X direction, and the plurality of second openings 132op may be arranged along a second virtual row L2 extending in the +X direction and different from the first virtual row L1.

Although two reaction patterns (i.e., the first and second reaction patterns 121 and 122) are shown in FIG. 4, the number of reaction patterns is not limited thereto and three or more reaction patterns may be used in consideration of a leakage liquid monitoring area and the like.

A resistance measuring unit 200 is connected to the sensing unit 100a. The resistance measuring unit 200 is connected to each of the first and second reaction patterns 121 and 122 and measures a change in the electrical resistance of each of the first and second reaction patterns 121 and 122.

Referring to FIG. 4, each of the first and second reaction patterns 121 and 122 may be connected in parallel to the resistance measuring unit 200. In this case, substantially the same current is applied to each of the first and second reaction patterns 121 and 122 and thus a plurality of change graphs of electrical resistance may be obtained.

However, the connection between the resistance measuring unit 200 and each of the first and second reaction patterns 121 and 122 is not limited to the parallel connection, and the resistance measuring unit 200 and the first and second reaction measuring units 200 and 121 may all be connected in series to form a series circuit. In this case, a graph of a change in electrical resistance may be obtained based on the sum of the electrical resistances of the first and second reaction patterns 121 and 122.

As described above, since a plurality of reaction patterns are provided in a sensing unit, a contact area between the reaction patterns and a leakage liquid may increase to thereby improve the leakage sensitivity of chemicals. In addition, even if one reaction pattern is damaged, a change in electrical resistance may be measured by the other reaction pattern.

Referring to FIG. 5, in the leakage detection system according to another embodiment, a sensing unit 100b includes one reaction pattern 121, and a plurality of openings 130op exposing the reaction pattern 121 may be formed in a plurality of rows.

Also, in the present embodiment, the sensing unit 100b includes a leakage-reacting layer 120 positioned on a base layer (not shown), and a protective layer 130 positioned on the leakage-reacting layer 120.

In an embodiment, the leakage-reacting layer 120 includes the reaction pattern 121 extending in the +X direction, and a plurality of first openings 131op and a plurality of second openings 132op may be formed in the protective layer 130 to expose the reaction pattern 121.

In this case, the plurality of first openings 131op may be positioned along a first virtual row L1 extending in the +X direction, and the plurality of second openings 132op may be positioned along a second virtual row L2 extending in the +X direction and different from the first virtual row L1.

Although two rows of the plurality of openings 130op are shown in FIG. 5, the plurality of openings 130op may be formed in three or more rows in consideration of a leakage liquid monitoring area and the like.

As described above, since the plurality of openings 130op for exposing a portion of the reaction pattern 121 in the sensing unit 100b are formed in a plurality of rows, a contact area between the reaction pattern 121 and a leakage liquid may increase to thereby improve the leakage sensitivity of chemicals.

Referring to FIG. 6, in the leakage detection system according to another embodiment, a sensing unit 100c may further include a conductive pattern 125 in addition to a reaction pattern 121.

Also in the present embodiment, the sensing unit 100c includes a leakage-reacting layer 120 positioned on a base layer (not shown), and a protective layer 130 positioned on the leakage-reacting layer 120.

In an embodiment, the leakage-reacting layer 120 may include a reaction pattern 121 extending in the +X direction and a conductive pattern 125 extending in the +X direction. In this case, the conductive pattern 125 may be arranged to be spaced apart from the reaction pattern 121 in the +Y direction, which is the width direction of the base layer or the protective layer 130.

A plurality of openings 131op are formed in the protective layer 130, and thus, a portion of the reaction pattern 121 is exposed through the plurality of openings 131op.

A resistance measuring unit 200, the reaction pattern 121, and the conductive pattern 125 may all be connected in series to form a series circuit. In this case, when a leakage liquid contacts the reaction pattern 121 and the conductive pattern 125 in a state where a direct current is supplied from the resistance measuring unit 200, a change in electrical resistance may occur due to the physical properties of graphene in the reaction pattern 121 as in the above-described embodiments, and a short may occur in a circuit in which the reaction pattern 121 and the conductive pattern 125 are connected in series.

Therefore, it is possible to more precisely check the leakage of chemicals by using the change in electrical resistance and the short.

Figure 7:
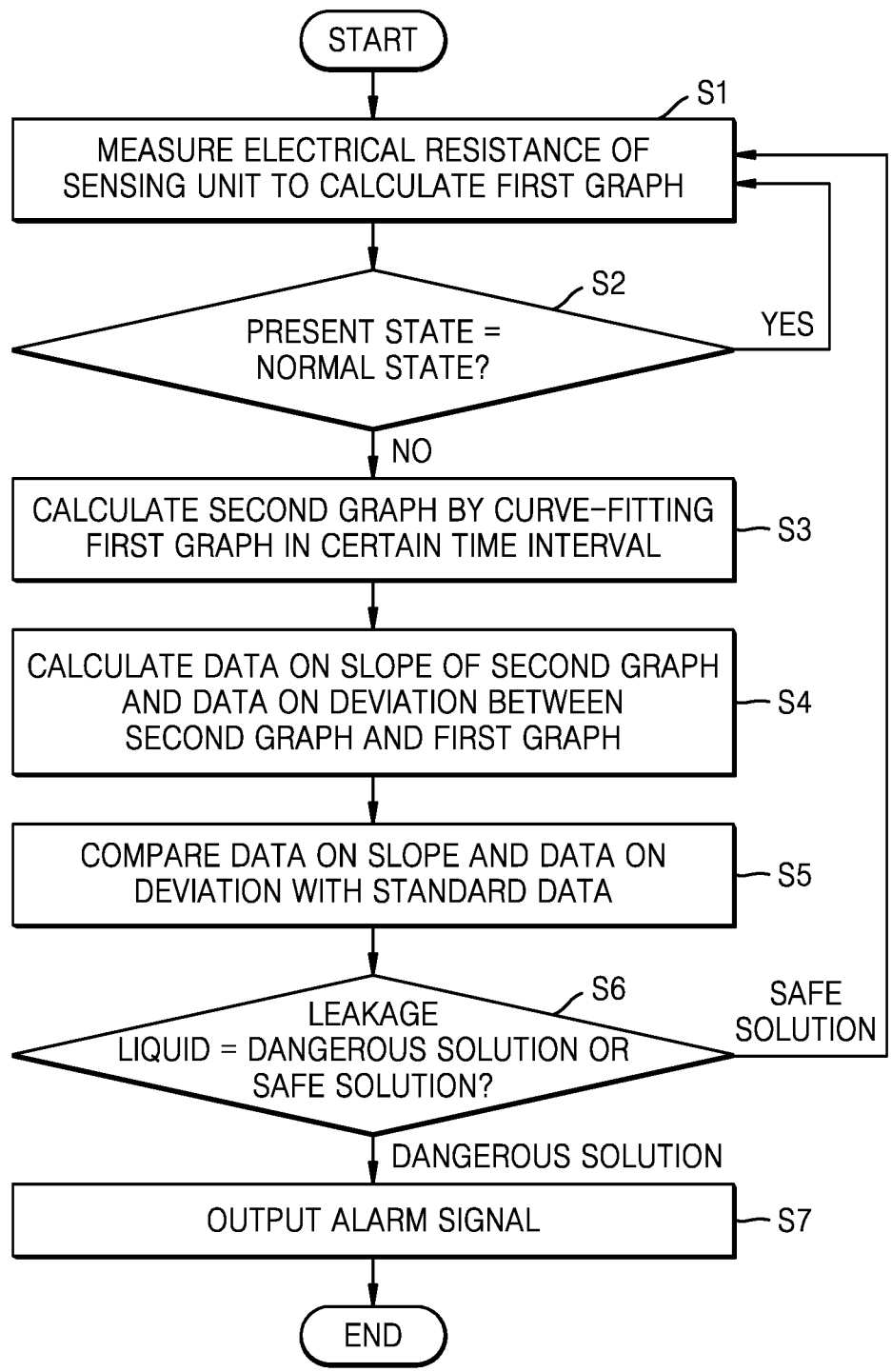
FIG. 7 is a flowchart of a leakage detection method according to an embodiment.
Figure 8A:
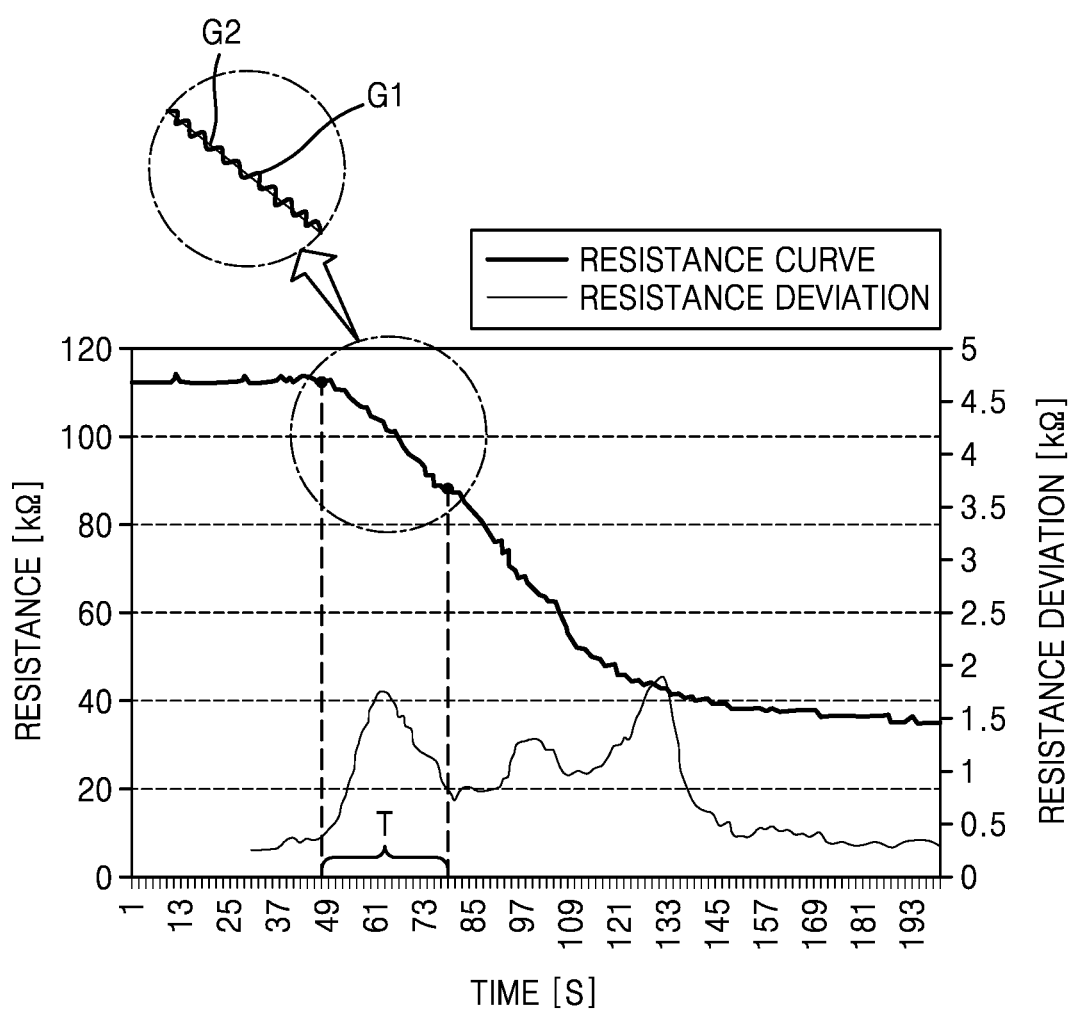
FIGS. 8A and 8B are graphs showing resistance-time curves plotted by a sensing unit when chemicals and water are detected using a leakage detection method according to an embodiment.
Figure 8B:
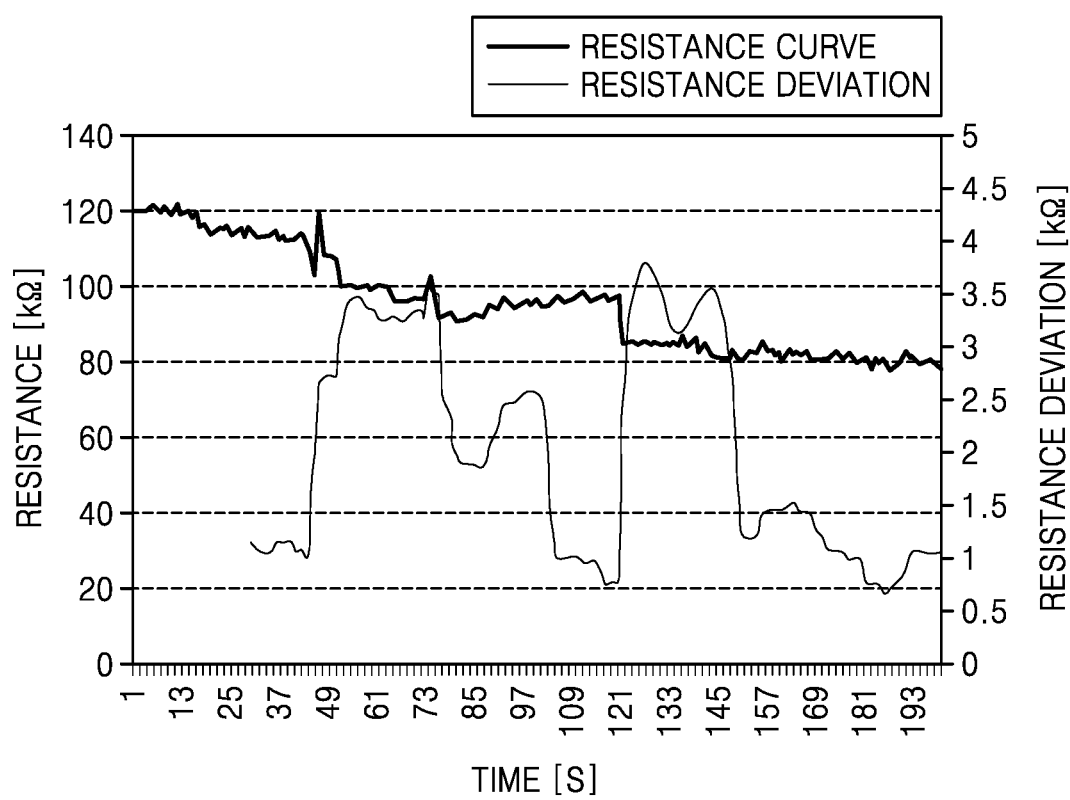
Figure 9A:
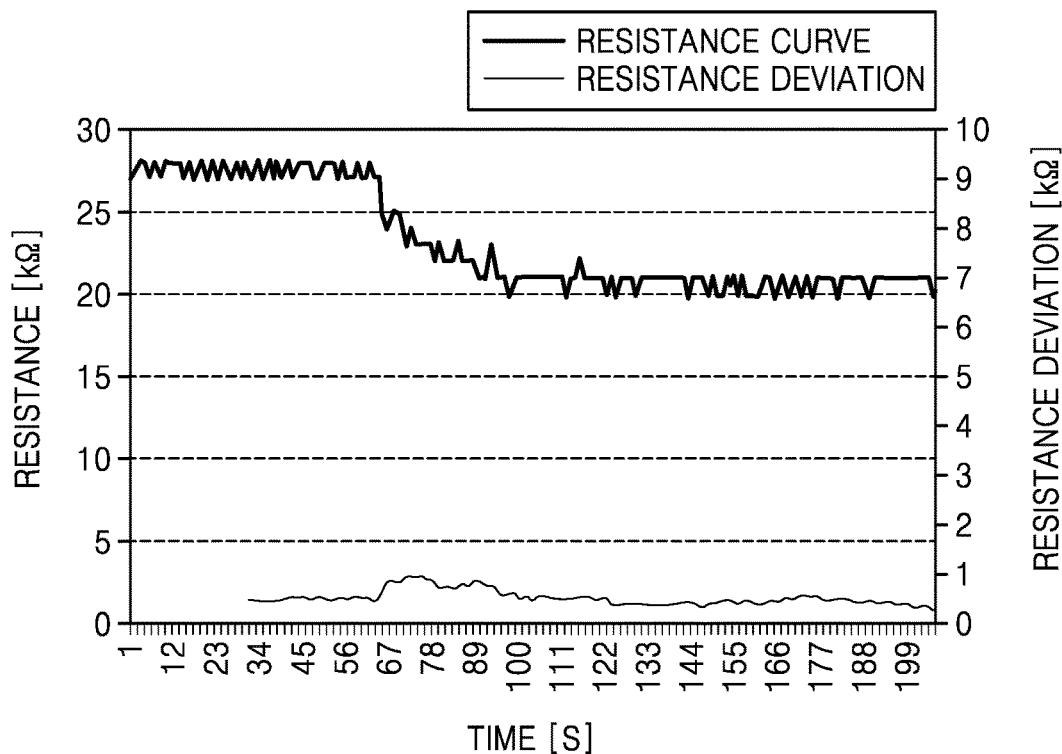
FIGS. 9A and 9B are graphs showing resistance-time curves plotted by a sensing unit when chemicals and water are detected using a leakage detection method according to another embodiment.
Figure 9B:
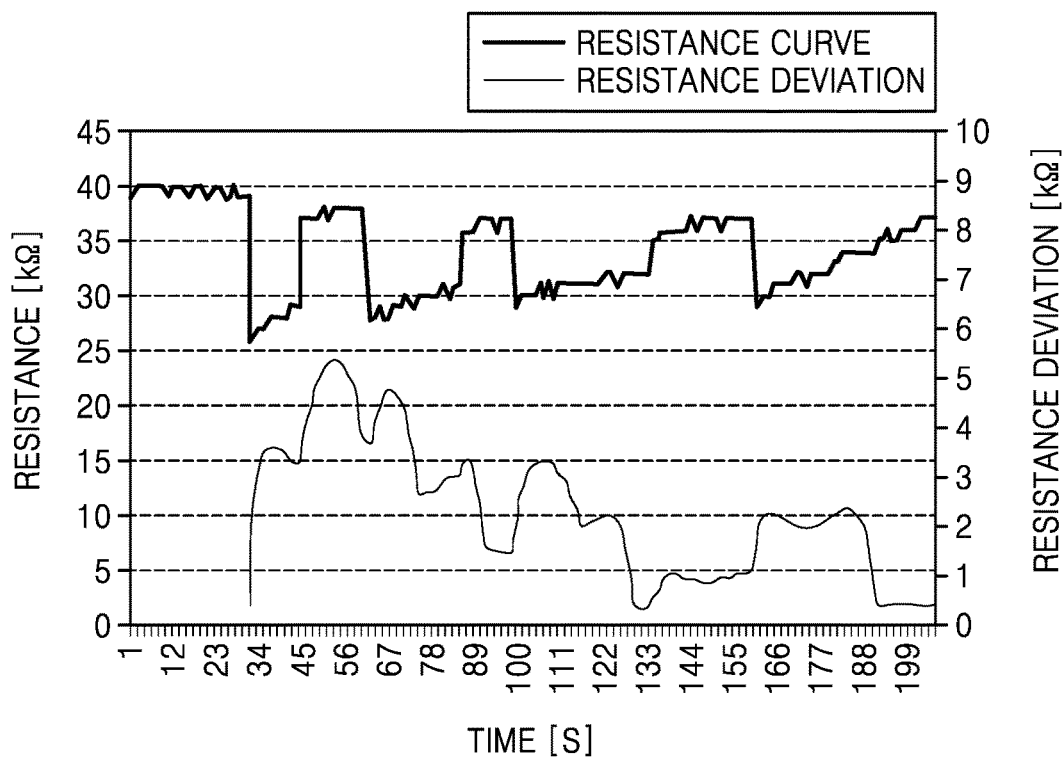

FIG. 7 is a flowchart illustrating a leakage detection method according to an embodiment. FIGS. 8A and 8B are graphs showing resistance-time curves plotted by a sensing unit when chemicals and water are detected using the leakage detection method according to the embodiment. FIGS. 9A and 9B are graphs showing resistance-time curves plotted by a sensing unit when chemicals and water are detected using a leakage detection method according to another embodiment.

The leakage detection method according to the embodiment may include operations as shown in FIG. 7. In this case, the operations may be performed using the leakage detection system according to the embodiments described with reference to FIG. 1 and the like.

First, operation S1 of measuring the electrical resistance detected by a sensing unit to calculate a first graph is performed.

Operation S1 may be divided into two sub-operations. Specifically, a first operation of measuring the electrical resistance of at least one reaction pattern by applying a direct current to a sensing unit in contact with a leakage liquid is performed, and then, a second operation of calculating a first graph indicating a change in the electrical resistance with time based on a result measured in the first operation is performed.

In the first operation, the electrical resistance of the at least one reaction pattern is measured in real time while a direct current is continuously applied to the sensing unit.

In an embodiment, a direct current may be allowed to flow continuously in a single direction. In another embodiment, a direction in which a direct current flows may be switched to cause the direct current to flow alternately in a forward direction and a reverse direction. When the direction of the flow of the direct current is switched as in the latter case, the accuracy of a result of the measurement may be further enhanced as compared with a case where the direct current is applied in a single direction as in the former case.

Thereafter, in the second operation, a first graph having an electrical resistance-time curve shape, in which the Y axis corresponds to the electrical resistance measured in real time and the X axis corresponds to the flow of time, is calculated. In this operation, a process in which the electrical resistance measured in the first operation is converted into a digital value may be performed.

For example, FIG. 8A illustrates a resistance-time curve for a reaction pattern when an acidic solution contacts the reaction pattern, and a curve represented by a thick solid line corresponds to the first graph which is original data. In this case, graphene contained in the reaction pattern reacts with the acidic solution and thus the electrical resistance of the graphene tends to decrease with time.

For example, FIG. 8B illustrates a resistance-time curve for a reaction pattern when water contacts the reaction pattern, and a curve represented by a thick solid line corresponds to the first graph which is original data. In this case, graphene contained in the reaction pattern reacts with water and thus the electrical resistance of the graphene tends to changes continuously. That is, the first graph shows a tendency to irregularly oscillate up and down.

While FIGS. 8A and 8B illustrates results obtained by measuring the electrical resistance of a reaction pattern in a case where a direct current flows in a single direction, FIGS. 9A and 9B illustrates results obtained by measuring the electrical resistance of a reaction pattern in a case where a direction in which a direct current flows is switched.

For example, FIG. 9A illustrates a resistance-time curve for a reaction pattern when an acidic solution contacts a reaction pattern, and a curve represented by a thick solid line corresponds to the first graph which is original data. Also in this case, similar to FIG. 8A, graphene contained in the reaction pattern reacts with the acidic solution and thus the electrical resistance of the graphene tends to decrease with time.

For example, FIG. 9B illustrates a resistance-time curve for a reaction pattern when water contacts a reaction pattern, and a curve represented by a thick solid line corresponds to the first graph which is original data. Also in this case, similarly to FIG. 8B, graphene contained in the reaction pattern reacts with water and the electrical resistance of the graphene irregularly repeatedly changes.

After the first and second operations, operation S2 of determining whether or not the present state is a normal state, based on the measured electrical resistance is further performed. That is, in the first graph, when there is no particular change in the value of the electrical resistance according to the passage of time, the present state may be a normal state in which no contact with a leakage liquid occurs. When there is a significant change in the value of the electrical resistance according to the passage of time, the present state may be a state in which a leakage liquid such as chemicals or water is in contact with the reaction pattern.

Therefore, when there is no significant change in the value of the electrical resistance in the first graph calculated in the second operation, the first operation is performed again to measure the electrical resistance of the reaction pattern in real time. When there is a significant change in the value of the electrical resistance in the first graph, operation S3 that is a next operation is performed, That is, operation S3 of calculating a second graph by curve-fitting, in a certain time interval, the first graph calculated in operation S1 is performed.

In operation step S3, a certain time interval T is selected with respect to the X axis of the graph as shown in FIG. 8A, and the pattern of a first graph G1 is curve-fit in the certain time interval T to thereby calculate a second graph G2 approximating the first graph G1. The curve fitting in such a certain time interval may be continuously performed.

In an embodiment, a second graph G2 approximating the first graph G1 may be calculated using a regression analysis as a curve fitting method, In the case of using a simple linear regression analysis, the second graph G2 may be expressed by a linear function as shown in Equation 1, where the coefficients and constants in Equation 1 may be expressed by Equation 2.

$$y = a + bx \qquad \text{[Equation 1]}$$

$$a = \frac{\sum y \sum x^2 - \sum x \sum xy}{n \sum x^2 - (\sum x)^2} \qquad \text{[Equation 2]}$$

$$b = \frac{n \sum xy - \sum x \sum y}{n \sum x^2 - (\sum x)^2}$$

In this case, x and y in Equation 1 denote time and resistance values, respectively, and n in Equation 2 denotes the number of data.

However, the curve fitting method is not necessarily limited to the linear regression analysis, and a multiple regression analysis may be used as the curve fitting method. In addition, a curve function that is not a linear function may be used as a function of the second graph G2.

Next, operation S4 of calculating data on the slope of the second graph G2 calculated by Equations 1 and 2 and data on the deviation between the second graph G2 and the first graph G1 is performed.

Referring to FIG. 8A, in operation S4, a linear slope of the second graph G2 calculated in operation S1 and a standard deviation of the first graph G1 with respect to the second graph G2 are calculated. The slope of the second graph G2 may be calculated in various manners. When the second graph G2 is a linear function graph, the slope of the second graph G2 may be a linear slope of the second graph G2. On the other hand, when the second graph G2 is a curve function graph, the slope of the second graph G2 may be an average of a tangent slope of the second graph G2 in the certain time interval T. This is merely an example, and various methods may be used to calculate the slope of the second graph G2.

The standard deviation of the first graph G1 with respect to the second graph G2 may be calculated by Equation 3 or Equation 4.

$$RMSE\text{(mean square root error)} = \sqrt{\frac{d_1^2 + d_2^2 + \ldots + d_n^2}{n-2}} \qquad \text{[Equation 3]}$$

$$\text{Standard deviation} = \sqrt{\frac{(x_1 - m)^2 + (x_2 - m)^2 + \ldots + (x_n - m)^2}{n}} \qquad \text{[Equation 4]}$$

In this case, $d_1$, $d_2$, ..., and $d_n$ in Equation 3 denote values obtained by subtracting an estimated resistance value calculated by Equations 1 and 2 from a measured resistance value. In Equation 4, $x_1$, $x_2$, and $x_n$ denote time and m denotes an average value. In Equations 3 and 4, n denotes the number of data, as described above.

The curve of the thin solid line shown in FIG. 8A is a graph showing a standard deviation between the second graph G2, which is a linear function graph, and the first graph G1, which corresponds to the distribution of actual measured values.

Data on the slope and data on the deviation, calculated as described above, may be stored in real time in a database unit. The stored data may be used as basic data for the generation of standard data to be used as a basis for determining a dangerous solution or a safe solution.

Specifically, resistance-time curves of the reaction pattern contacting an acidic solution may be stored in a database and a standard resistance-time curve of the reaction pattern for the acidic solution may be derived from the resistance-time curves. Likewise, resistance-time curves of the reaction pattern contacting an alkaline solution may be stored in a database and a standard resistance-time curve of the reaction pattern for the alkaline solution may be derived from the resistance-time curves. Therefore, in the standard resistance-time curve for the acidic solution (or the alkaline solution) derived through the above-described process, data on the slope and data on the deviation may be calculated as first standard data and second standard data, respectively.

In addition, resistance-time curves of the reaction pattern contacting water may also be stored in a database as described above to derive a standard resistance-time curve of the reaction pattern for water, and then data on the slope of the standard resistance-time curve may be calculated as third standard data and data on the deviation of the standard resistance-time curve may be calculated as fourth standard data.

Next, operation S5 of comparing data on the slope of the first graph and data on the deviation between the second graph and the first graph, calculated in the present state, with the first to fourth standard data described above is performed.

Operation S5 corresponds to an operation of determining whether a leakage liquid presently contacting the reaction pattern is a dangerous solution or a safe solution.

Referring to FIG. 8A, the data on the slope of the first graph G1 is compared with the first standard data, which is materials for determining an acidic solution (or alkaline solution), and the third standard data, which is materials for determining water, to analyze similarity between data based on the materials for the determining and the present measurement values.

In addition, the data on the deviation of the first graph G1 is compared with the second standard data, which is materials for determining an acidic solution (or alkaline solution), and the fourth standard data, which is materials for determining water, to analyze similarity between data based on the materials for the determining and the present measurement values.

Thereafter, operation S6 of determining whether a leakage liquid is a dangerous solution or a safe solution based on the similarity analyzed in operation S5 is performed.

In operation S6, when the data on the slope of the first graph G1 and the data on the deviation of the first graph G1 are analyzed to be similar to the first standard data and the third standard data, respectively, a leakage liquid that is presently in contact with the reaction pattern may be determined to be an acidic solution (or an alkaline solution). However, when the data on the slope of the first graph G1 and the data on the deviation of the first graph G1 are analyzed to be similar to the second standard data and the fourth standard data, respectively, a leakage liquid that is presently in contact with the reaction pattern may be determined to be water.

Next, if it is determined in operation S6 that a leakage liquid is water, which is a safe solution, operation S1 of measuring the electrical resistance of the reaction pattern is performed again. If it is determined in operation S6 that a leakage liquid is an acidic solution (or an alkaline solution) that is a dangerous solution, operation S7 of outputting an alarm signal is performed.

In operation S7 of outputting an alarm signal, the alarm signal may be output in the form of a warning sound or a warning screen or may be output in the form of transmitting a notification message to an administrator. As a result, the administrator who has confirmed information about the leakage of chemicals may quickly take measures such as maintenance of equipment and prevention of leakage.

Referring to FIGS. 8B, 9A and 9B, as in FIG. 8A, a first graph corresponding to the distribution of actual measurement values is represented by a thick solid line and a deviation between the first graph and a second graph obtained by curve-fitting the first graph is represented by a thin solid line.

When comparing a resistance deviation-time curve represented by the thin solid line in FIG. 8A with a resistance deviation-time curve represented by the thin solid line in 8B, it may be seen that a reaction pattern in contact with an acidic solution has a smaller resistance deviation than a reaction pattern in contact with water. The same may be seen when comparing the thin solid line in FIG. 9A with the thin solid line in FIG. 9B.

Referring to FIGS. 8A and 8B, when a current is applied in a single direction to a reaction pattern, both a resistance deviation graph with respect to an acidic solution (see the thin solid line in FIG. 8A) and a resistance deviation graph with respect to water (see the thin solid line in FIG. 8B) have irregular patterns. On the other hand, referring to FIGS. 9A and 9B, when a current is applied to a reaction pattern while switching in a forward direction and a reverse direction, the resistance deviation graph with respect to water (see the thin solid line in FIG. 9B) has a much more irregular pattern than the resistance deviation graph with respect to an acidic solution (see the thin solid line in FIG. 8A).

Therefore, it may be understood that the accuracy of measurement results is higher in a case where a direction in which the current is applied to a reaction pattern is switched than in a case where current is applied in a single direction to the reaction pattern.

As described above, according to the embodiments, the leakage sensitivity with respect to chemicals may be improved, Also, it is possible to easily distinguish between chemicals and water, and thus, it is possible to quickly detect the leakage of chemicals even if a user does not directly check a leakage solution via the naked eye and the like.

It should be understood that embodiments described herein should be considered in a descriptive sense only and not for purposes of limitation, Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A leakage detection system comprising:
a sensing unit that contacts a leakage liquid;
a resistance measuring unit configured to measure an electrical resistance of the sensing unit by applying a direct current to the sensing unit; and
a determination unit configured to determine whether the leakage liquid is a dangerous solution or a safe solution based on a first graph showing a change over time of the electrical resistance measured by the resistance measuring unit,
wherein the dangerous solution is an acidic solution or an alkaline solution and the safety solution is water.

2. The leakage detection system of claim 1, wherein the determination unit comprises a calculation unit configured to calculate data about a slope of a second graph obtained by performing curve-fitting of measured values of the electrical resistance in a certain time interval and data about a deviation between the second graph and the first graph.

3. The leakage detection system of claim 1, further comprising:
a database unit configured to store first standard data about the slope and second standard data about the deviation with respect to at least one of the acidic solution and the alkaline solution, and third standard data about the slope and fourth standard data about the deviation with respect to the water.

4. The leakage detection system of claim 3, wherein the determination unit is configured to compare data about the slope calculated based on present measurement values of the electrical resistance with the first standard data and the third standard data, and compare data about the deviation calculated based on the present measurement values of the electrical resistance with the second standard data and the fourth standard data.

5. The leakage detection system of claim 1, further comprising:
an output unit configured to output an alarm signal when the determination unit determines that the leakage liquid is the dangerous solution.

6. The leakage detection system of claim 1, further comprising:
an analog-to-digital converter configured to convert the measured electrical resistance into a digital value.

7. The leakage detection system of claim 1, wherein the sensing unit comprises:
a base layer;
a leakage-reacting layer positioned on the base layer and having at least one reaction pattern extending in a length direction of the base layer; and
a protective layer positioned on the leakage-reacting layer, wherein a plurality of openings exposing a portion of the at least one reaction pattern are spaced apart from each other in the protective layer.

8. The leakage detection system of claim 7, wherein the at least one reaction pattern comprises at least one of graphene and graphite, a conductive polymer, and a binder.

9. The leakage detection system of claim 7, wherein the at least one reaction pattern comprises a first reaction pattern and a second reaction pattern spaced apart from each other in a width direction of the base layer.

10. The leakage detection system of claim 7, wherein the plurality of openings comprise a plurality of first openings positioned along a first virtual row extending in the length direction of the base layer and a plurality of second openings positioned along a second virtual row extending in the length direction of the base layer.

11. The leakage detection system of claim 7, wherein the leakage-reacting layer comprises a conductive pattern extending in the length direction of the base layer, and the conductive pattern is spaced apart from the at least one reaction pattern in a width direction of the base layer.

12. A leakage detection method comprising:
   measuring an electrical resistance of a sensing unit in contact with a leakage liquid by applying a direct current to the sensing unit; and
   determining whether the leakage liquid is a dangerous solution or a safe solution based on a first graph showing a change over time of the measured electrical resistance,
   wherein the dangerous solution is an acidic solution or an alkaline solution, and the safety solution is water.

13. The leakage detection method of claim 12, wherein the measuring of the electrical resistance of the sensing unit comprises switching a direction in which the direct current flows and measuring the electrical resistance in real time.

14. The leakage detection method of claim 13, further comprising, after the measuring of the electrical resistance of the sensing unit, determining whether a present state is a normal state based on the measured electrical resistance.

15. The leakage detection method of claim 13, further comprising:
   obtaining a second graph by curve-fitting the first graph in a certain time interval; and
   calculating data about a slope of the second graph and data about a deviation between the second graph and the first graph.

16. The leakage detection method of claim 15, further comprising:
   storing the calculated data about the slope and the calculated data about the deviation in real time in a database unit.

17. The leakage detection method of claim 15, wherein the determining of whether the leakage liquid is the dangerous solution or the safe solution comprises comparing data about the slope and data about the deviation, calculated based on present measurement values of the electrical resistance, with standard data.

18. The leakage detection method of claim 17, wherein the standard data comprises:
   first standard data about the slope and second standard data about the deviation, with respect to the acidic solution or the alkaline solution; and
   third standard data about the slope and fourth standard data about the deviation, with respect to the water.

19. The leakage detection method of claim 12, further comprising:
   outputting an alarm signal when it is determined that the leakage liquid is the dangerous solution.

20. The leakage detection method of claim 12, further comprising:
   converting the measured electrical resistance into a digital value.

* * * * *